(12) United States Patent
Dillon

(10) Patent No.: US 11,074,070 B2
(45) Date of Patent: Jul. 27, 2021

(54) INTERFACE EFFECT MINIMIZATION BY SOFTWARE DESIGN

(71) Applicant: Brian S. Dillon, King George, VA (US)

(72) Inventor: Brian S. Dillon, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/682,020

(22) Filed: Nov. 13, 2019

(65) Prior Publication Data

US 2020/0150955 A1 May 14, 2020

Related U.S. Application Data

(60) Provisional application No. 62/760,345, filed on Nov. 13, 2018.

(51) Int. Cl.
*G06F 8/76* (2018.01)
*G06F 8/41* (2018.01)
*G06F 8/30* (2018.01)

(52) U.S. Cl.
CPC .......... *G06F 8/76* (2013.01); *G06F 8/37* (2013.01); *G06F 8/427* (2013.01)

(58) Field of Classification Search
CPC .......... G06F 8/10; G06F 9/465; G06F 8/76
See application file for complete search history.

(56) References Cited

U.S. PATENT DOCUMENTS

| | | | |
|---|---|---|---|
| 6,173,327 B1* | 1/2001 | De Borst | G06F 9/465 707/999.202 |
| 7,047,518 B2* | 5/2006 | Little | G06F 8/10 717/104 |
| 7,516,440 B2* | 4/2009 | Upton | G06F 9/541 717/106 |
| 7,650,590 B2* | 1/2010 | Bender | G06F 8/35 717/106 |
| 8,095,491 B1 | 1/2012 | Dillon | 706/46 |
| 9,087,295 B1 | 7/2015 | Dillon | |
| 10,346,287 B1 | 7/2019 | Dillon | |
| 2005/0022208 A1* | 1/2005 | Bolar | H04L 41/0226 719/315 |
| 2007/0047279 A1* | 3/2007 | Evans | G06F 9/541 365/1 |

(Continued)

OTHER PUBLICATIONS

Spring Framework Guru, "Bridge Pattern", Jul. 18, 2016, pp. 1-8 (Year: 2016).*

(Continued)

*Primary Examiner* — Duy Khuong T Nguyen
(74) *Attorney, Agent, or Firm* — Gerhard W. Thielman

(57) ABSTRACT

A method is provided for integrating interfaces in software. The method includes incorporating a library to the source file to produce a plurality of adapters and abstractions; compiling the adapters and abstractions into a digital library; transferring the adapters and abstractions into an application source code; linking the application source code with the library to produce a combination file; and compiling the combination file into an executable application file.

2 Claims, 15 Drawing Sheets

(56) References Cited

U.S. PATENT DOCUMENTS

2015/0227674 A1* 8/2015 Dumont ............... G06F 30/367
716/107

OTHER PUBLICATIONS

Inlerface Definition Language 4.2, OMG I8-01-05. http://www.omg.org/spec/IDL/4.2/PDF.
Jose M. Vidal: "Interface: Definition Language", developerWorks, IBM. http://jmvidal.cse.sc.edu/csce590/spring02/corba-idl-intro.pdf.
Jose M. Vidal: "Corba", 2004. http://jmvidal.cse.sc.edu/talks/corba/allslides.pdf.

* cited by examiner

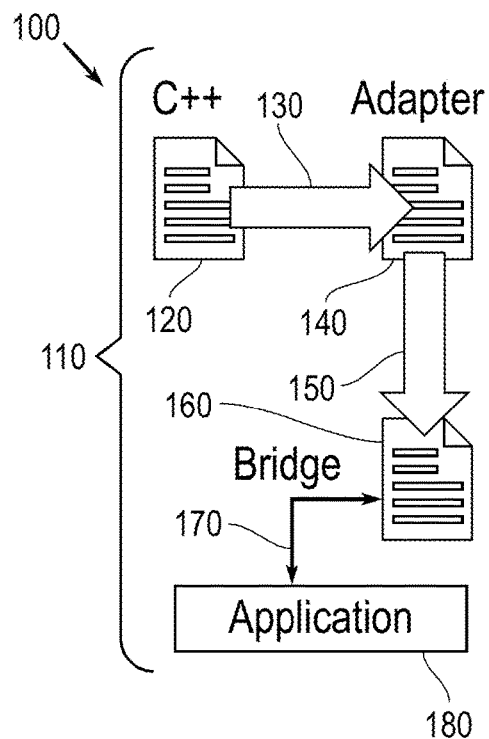
FIG. 1
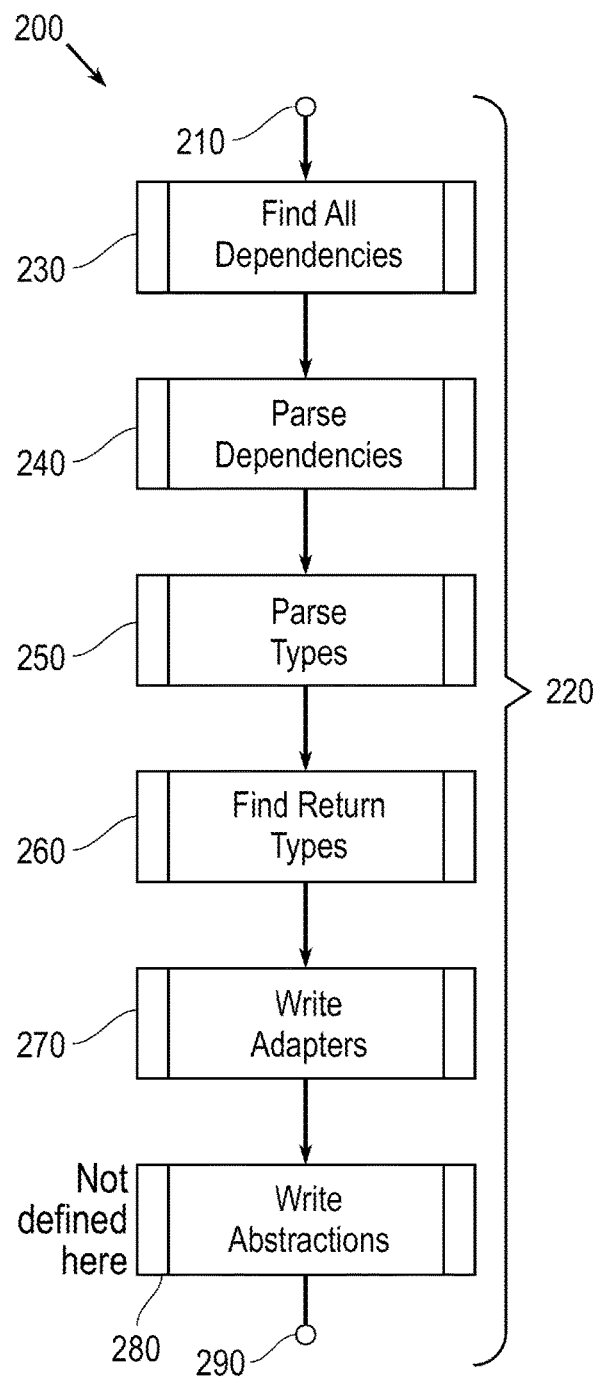
FIG. 2
| Parameter Code Table | | 300 |
|---|---|---|
| Parameter | Symbol | Label |
| dependency | deps | 310 |
| new class | L | 320 |
| class | C | 325 |
| new import | imports | 330 |
| import | i | 335 |
| nested class | x | 340 |
| enumation | e | 350 |
| union | u | 360 |
| typedef | t | 370 |
| typed member | m | 375 |
| location of type | m' | 380 |
| field | f | 390 |
FIG. 3

1010 — class SocketDescription_Adapter
{private:

...
public

1200

1210 — 
```
int getINTEGERMethod(int index) {
    switch(index) {
        case 0:
            return getPortNumber();
    }
```

1220 —
```
    throw exception("No valid INTEGERMethod at "+index+" in SocketDescription_Adapter");
}
```

1230 —
```
char * getMethodName(int index) {
    switch(index){
        case 0:
            return "PortNumber";
        case 1:
            return "Delay";
        case 2:
            return "IP";
        case 3:
            return "Name";
    }
```

1240 —
```
    throw exception("No valid method at "+index+" in SocketDescription_Adapter");
}
```

FIG. 12

INTERFACE EFFECT MINIMIZATION BY SOFTWARE DESIGN

CROSS REFERENCE TO RELATED APPLICATION

Pursuant to 35 U.S.C. § 119, the benefit of priority from provisional application 62/760,345, with a filing date of Nov. 13, 2018, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to aggregating codes together. In particular, the invention relates to integrating interfaces in software.

Software sometimes has to operate with multiple third-party libraries or interfaces. This can complicate the structure of the application and artificially increase the complexity of its functionality. Moreover, these interfaces are volatile in nature, subject to change in content and function not to mention adding new interfaces outright. Because these interfaces are subject to change, the application, which supports the interfaces must also undergo change—not because its functional requirements have altered, but only to keep in synch with interfaces the code uses. Various strategies exist to counteract these changes depending on the exact domain, language, and architecture of the application in question.

Definitions for data entry and code integration include:

Strong typing—The type of a field defines its function, making it an unacceptable field for some data. A field designated for integers may accept an integer or a number of related types (e.g., short), similar types with a cast (e.g., long), but cannot accept incompatible types (e.g., a string).

Weak typing—The type of a field is defined by the data, making all data acceptable. A field has no designated type, but when it receives an integer it becomes and integer. Similarly, when it receives a string, it becomes a string.

Statically compiled—A programming language that is compiled into machine code that will run on the hardware of operating system of a specific target computer. Thus if an application is to run on 64-bit Windows 10 and 32-bit Ubuntu, two distinct compilations are required targeting each system. Because the code is optimized at compile time, it can run faster but it leaves no flexibility to handle new situations as the program runs.

Dynamically compiled—A programming language compiled into an intermediary form that cannot run on any specific architecture. An additional interpretive layer is required to change the compiled instructions into machine instructions compatible with the target computer. Because of this interpretation layer, many changes may be introduced while running the program, adding flexibility to account for unknown quantities discovered during the execution of the program.

Enumeration—A set of identifiers that is linked to numerical values, typically an ordered set, such that each value is equivalent to a human readable value. For example the enumeration of colors {Red=1, Blue=2, Yellow=3}. Using an enumeration enables the operator to easily refer to the concept of Blue by its numeric equivalent 2 and to quickly interpret the meaning of 3 as "Yellow".

Code bloat—A euphemism for software that has increased in size far beyond functional requirements and typically because of poorly written code. The term is in common use in the practice, however, the exact definition is far from settled. As an example, multiple methods could be created to perform the same function for slightly different data types when a single method could be used for all data types if the differences between the types were handled first.

Multiple interfaces are common and expected in commercially-produced code. JSON, REST, and other similar solutions are able to handle the variation in these interfaces for web-based solutions. This is partially due to the structured language constructs used to describe the data being shared and partially because of the flexibility of web-based languages, which do not typically exhibit strong typing. These features enable the sender to describe the data being sent in the interface (the number of data members, the name of each field, the type of each field) and enables the recipient to accept the data into weakly typed fields. For this reason, many web interfaces manage a multi-interface exchange without any problem.

For very different reasons, data sent using Java objects are also accessible to the receiver. Java is unique in its definition of the Reflection API. This library of methods enables the program to list and investigate all members of the Java object. By finding the number, names, and type of all fields, the recipient has the same kind of access to the data within the Java object that the sender has. Java is a strongly typed language, however, the unprecedented availability of the object's members through the Reflection API obviates the need for weak typing.

The next option to handle multiple interfaces depends on an Interface Description Language (IDL), which will describe the data being passed. IDLs may be generic (e.g., CORBA) or specific to a private interface (e.g., TENA). Essentially, all IDLs are equivalent as they specify the name and type of all fields and are used to create classes in the target language that satisfy those specifications. For example, the same IDL file may be used to create equivalent classes in Java and C++ so that data may be passed between two programs written in each language. Another Neat Tool (ANT) is an open source tool from Apache is especially adept at writing classes based on the IDL description. An IDL may add additional elements such as version control, dependencies, etc., which add to the richness of individual IDLs, but that do not substantially depart from the main purpose of the IDL.

Each of these methods is fundamentally inadequate for a strongly-typed, statically compiled language like C++. This inadequacy may be partially addressed by developing objects, which represent each of the possible message types. This Band-Aid solution assumes that the message types will not change and that the message library will not expand. Violation of either assumption disables the existing object set from handling that change short of a new build and new compilation. Moreover, the application code, which depends on these objects, must develop the means to accept a panoply of different types. This condition leads to code bloat, and that bloated code also fails if any change occurs in the message set. Such brittleness counteracts the very flexibility of web-based applications.

The federal government is particularly adept at defining multiple, redundant interfaces, almost always drafting a new interface for any new pair of systems that must communicate with each other. Typically the documents describing these interfaces are very large (hundreds of pages) indicating the frequency of each message, its types, and names of the data. Often these interfaces used lengthy enumerations that must also be coded, even though many of the values are rare or no longer used.

The existence of multiple interfaces, especially for things that are relatively similar, is deeply frustrating. For example, two different interfaces may document enumerations for types of aircraft. The enumerations may be in completely different orders and the exact set of aircraft covered by the two sets may not agree at all. This often means that systems that are functionally identical (e.g., weapon targeting systems) do not speak the same language and are hopelessly impossible to integrate.

The federal government continually seeks to overcome this weakness mainly through common or universal interfaces. This perennial effort is frustrated by three natural phenomena. For the sake of analogy, consider a town where ten languages are spoken and someone tries to introduce a new "universal" language. First, there is a failure to adopt the new standard language, especially by those who are working well with their current language. What incentive is there to change? Second, the lack of universal adoption means that those who do speak the new language are still forced to adapt to a multi-language world, making the new language only one more among the others. Finally, given enough time, the new universal language would have to adapt to new words generated by the other languages. This drives change in the universal language and forces even the few adopters to handle the consequences of a universal language. For these reasons, a universal language is impossible to create or adopt.

SUMMARY

Conventional interface integration techniques yield disadvantages addressed by various exemplary embodiments of the present invention. In particular, various exemplary embodiments provide for integrating interfaces in software. The method includes incorporating a library to the source file to produce a plurality of adapters and abstractions; compiling the adapters and abstractions into a digital library; transferring the adapters and abstractions into an application source code; linking the application source code with the library to produce a combination file; and compiling the combination file into an executable application file.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 1 is a schematic view of a basic exemplary design of code automation and interfacing;

FIG. 2 is a flowchart view of an overall coding process;

FIG. 3 is a tabular view of a parameter list;

FIG. 12 is a code view of the public enumerated accessors among the group methods of the adapter class;

DETAILED DESCRIPTION

Figure 4:
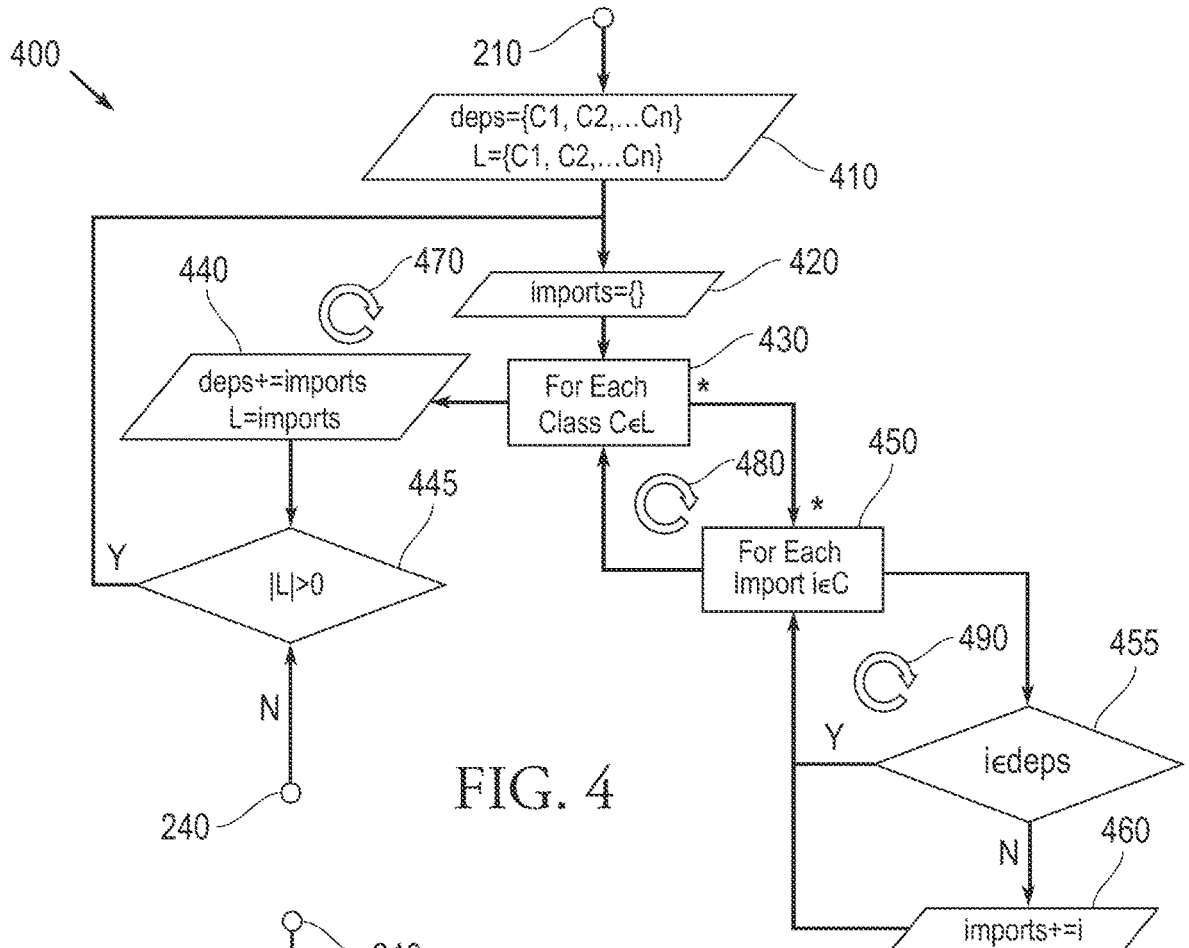
FIG. 4 is a flowchart view of a process to find all dependencies.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

Exemplary embodiments are provided to overcome the volatility of multiple interfaces by automating the coding process and creating an interface layer, which enables the application to uniformly handle the differences between interfaces. These embodiments were designed as a solution for C++ programs where strong typing and static compilation make it impossible to use alternative solutions. The embodiments employ standard object oriented design patterns, coupled with standard Python libraries to automatically generate the interpretive layer, and afford a number of additional benefits not anticipated from a multiple interface system. These embodiments can be useful in a variety of other applications, outside of C++ software where competing solutions exist, bringing the same secondary advantages.

Exemplary embodiments were developed in the face of a colossal programming requirement where some six-hundred individual interface types would be required in order to create a new system. Not only did each type need to be coded individually, but there were sure to be changes to that code. As the exemplary application was built, there would be changes to the code and thus each of the six-hundred interfaces. Later there would be changes to each of the six-hundred interface types or more types added, which would force additional development merely to keep up with minor changes. The solution to this problem needed to be proof against future change.

FIG. 1 illustrates a schematic view 100 of the basic design 110 for exemplary embodiments. Each type is represented as a C++ class 120 with various fields and methods. Using an automatic process 130 causes an Adapter file 140 to be built. This Adapter 140 implements an Adapter pattern by describing the C++ class 120 as well as the interface 150 defined by a Bridge interface 160. Through interaction with the common Bridge interface 160, denoted as arrow 170, an Application layer 180 gains access to the concrete Adapter 140 and thus the C++ class 120. Because the Bridge interface 160 is common to all C++ classes, the Application 180 has universal access to each of the six-hundred types. Artisans of ordinary skill will recognize that the Adapter 140 and Bridge 160 are well known design patterns. However, this configuration is unique, and the two types are automatically generated to match the imposed interface requirements by exemplary embodiments.

FIG. 2 shows a flowchart view 200 starting at a beginning node 210 of an overview operational process 220. Working with this design requires a number of steps. The overall process 220 encompasses steps: Find Dependencies 230, Parse Dependencies 240, Parse Types 250, Find Return Types 260, and Write Adapters 270. These processes correspond to views 400, 500, 600, 700, and 800 respectively. The step Write Abstractions 280 is not defined here, but is described in relation to the source code in views 1500, 1600 and 1700. The process 220 terminates at an ending node 290.

FIG. 3 shows a tabular view 300 of a Parameter Code List. The left column identifies parameters catalogued and sorted, the middle column corresponds to their symbols, while the right column denotes their associated labels. Thus, dependency 310 is identified as "deps", new class 320 is "L", class 325 is "C", new import 330 is "imports", import 335 is "i", nested class 340 is "x", enumeration 350 is "e", union 360 is "u", typedef 370 is "t" typed member 375 is "m", location 380 of type is "m" and field 390 is "f".

FIG. 4 shows a flowchart view 400 for finding dependencies between begin and end nodes 210 and 240. After the begin node 210, a first declaration 410 creates a set of dependencies (deps) 310 and new classes (L) 320, each of which contains classes (C) 325 from integers 1 to n. A second declaration 420 creates a set of imports 330 while a first loop 430 examines each class in the new classes set (L) 320.

The first loop 430 proceeds to a second loop 450 for each import 335 as an element of each class, leading to a first query 455 for whether each import is an element of the dependency set. For already known imports 335, the process returns to the second loop 450. For new imports 330, the process proceeds to a third declaration 460, which adds that import to the set of new imports 330. Upon exhaustion of all imports in the class 325, the process returns to the first loop 430. Asterisks for loops 430 and 450, etc. denote iterations.

When the set of new classes 320 is exhausted, control flows to a fourth declaration 440, which adds all new imports to the set of dependencies 319 and updates the set of new classes 320 to those discovered as new imports 330. A second query 445 inquires whether the size of the set of new classes 320 is positive, e.g., non-empty. If the set is non-empty, the process returns to the second declaration 420 and the set of new imports 330 is rejuvenated, effectively creating another loop 470 that repeats the process for all new classes 320. Otherwise, the process terminates at the end node 240.

This process conducts an exhaustive search for all dependencies within the selected interface types. The original set of interface types is provided as the input to sets in declaration 410. With each iteration of the loop from declaration 420 to cycles 480 and 490, a set of new imports 330 is discovered. Each import is added to the list of all dependencies 310 and then the new imports are examined in the next iteration. While there is no guarantee that the process will terminate, in practice there is a limit to the number of dependencies 310. Consider that C1 may have dependencies on D1, D2, and D3. This adds three new classes 320 to be examined in view 400. However, these dependencies 310 may not be unique such that C2 is also dependent on D3. Not only does this create efficiencies in the examination of all dependencies in the original set C1, C2, etc., but the dependencies of D1, D2, D3, etc. will also be limited. D2 may depend on D3, which is already known. D1 and D3 may depend on E1, which is added to new classes 320. Experimentation has shown that at each iteration, the number of new classes 320 tends to decrease. Finally, the set contains all dependencies 310, including the original interface types.

Figure 5:
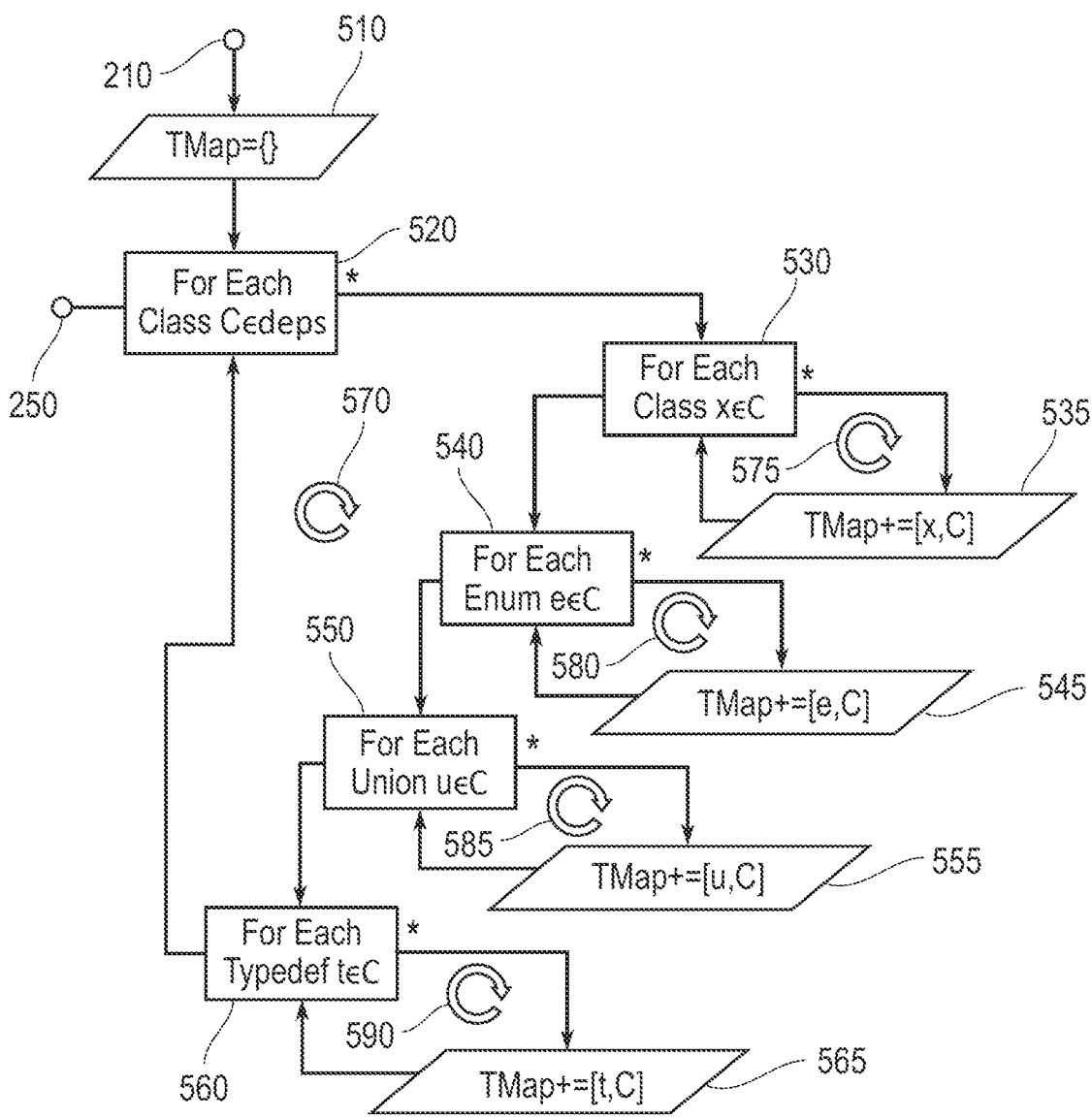
FIG. 5 is a flowchart view of a process to parse dependencies.

FIG. 5 shows a flowchart view 500 for parsing dependencies 310. The Type map is created in first declaration 510. A first loop 520 examines each class (C) in the dependencies (deps) collection for declaration 410 received from view 400. A second loop 530 for nested classes (x) 340 within the class (C) 325 assigns by second declaration 535 in the Type map of declaration 510. A third loop 540 for each enumeration (e) 350 within the class 325 assigns third declaration 545 in the Type map. A fourth loop 550 for each union (u) 360 within the class 325 assigns fourth declaration 555 in the Type map. A fifth loop 560 for each typedef (t) 370 within the class 325 assigns fifth declaration 565 in the Type map. Within each sub loop specific types are discovered within class 325: nested class (x) 530, enumeration (e) 540, union (u) 550, and typedef (t) 560. Skilled artisans can see that this set of loops is not exhaustive, but these exemplary embodiments serve to demonstrate the nature of the process.

View 500 identifies the typed elements within the class 325 examined sequentially by loops 530, 540, 550, and 560 as part of first cycle 570, subdivided into second cycle 575 for the nested classes (x) 340 in the second loop 530 and declaration 535, third cycle 580 for the enumeration (e) 350, fourth cycle 585 for the union (u) 360, fifth cycle 590 for the typedef (t) 370. In each cycle 575, 580, 585, and 590, the typed elements are added to the map collection in declarations 535, 545, 555, and 565 until the full set is exhausted and control flows to the next sub loop in the sequence. When the process returns to loop 520 the next class is examined until the set of dependencies 310 is exhausted and the process ends.

This process conducts an exhaustive survey of the typed elements within the known dependencies (deps). The list of nested classes (x) 340, enumerations (e) 350, unions (u) 360, and typedefs (t) 370 may be augmented by those skilled in the art to include any program element of interest. In each case, the element is added to TMap in declaration 510 indicating that the element in question is to be found in that class 325. Later this map may be used to find the code element again. In exemplary embodiments this was accomplished through the use of Python's C++ HeaderParser library (pypi.python.org/pypi/CppHeaderParser/), but the survey may be conducted by any similar library. Primitive types (e.g., integers, floating point numbers, characters) are kept in a separate collection not shown here.

Figure 6:
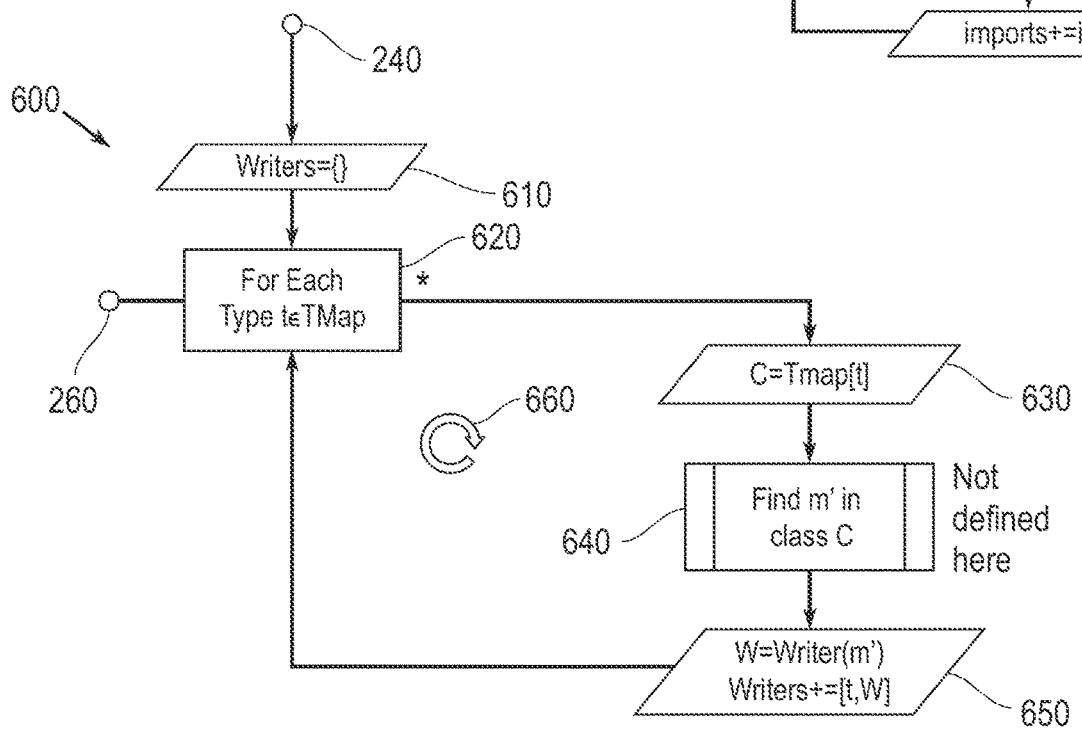
FIG. 6 is a flowchart view of a process to parse types.

FIG. 6 shows a flowchart view 600 for parsing types from dependency parsing 240 to finding return types 260. The Writer map is created in first declaration 610. Loop 620 examines each typed member (m) 375 (e.g., x, e, u and t) in the TMap collection from definition 510 received from view 500. Loop 620 executes for each member (m) 375 in the TMap. The class 325 where m is found is retrieved from the TMap in second declaration 630. Through a process not defined here (640) the location (m') 380 of member (m) 375 within the class 325 is discovered. In the exemplary embodiments, the exact location m' within the C++ HeaderParser class was needed to cue parsing of the types in process 250 and may not be necessary in all embodiments. In declaration 650, Writer is created from location 380 and added to the map in declaration 610 as the accepted Writer for each member 375 in declaration 620. The process for creating the writer in declaration 650 is not shown here and may be loosely defined as the instantiation of an object, which will write the adapter's code. This process is highly dependent on the application layer 180 and may be developed by those who are skilled in the art to satisfy their own needs. Loop 660 continues until the TMap is exhausted and the process ends.

This process uses the typed members in the TMap to create a set of Writers specific to each member 375. These Writers are placed in declaration 610 so that reference to any type may be immediately associated with a Writer in declaration 610. Those with ordinary skill in the art will note that this process may be combined with view 500 for greater efficiency, but is shown here in these exemplary embodiments for clarity. Writers may be defined for each of the member types surveyed in view 500 as it may be beneficial to define specific types of Writers. For example, enumerations are distinct from classes and require far less descriptive code, being essentially a map of strings to integer values. Creating a Writer specific to enumerations significantly reduces the difficulty in using that type (e). For similar reasons, Unions require special handling, which defies the basic structure of a class (x). The exact number of Writer subtypes will depend on the specific application for which they are built.

Figure 7:
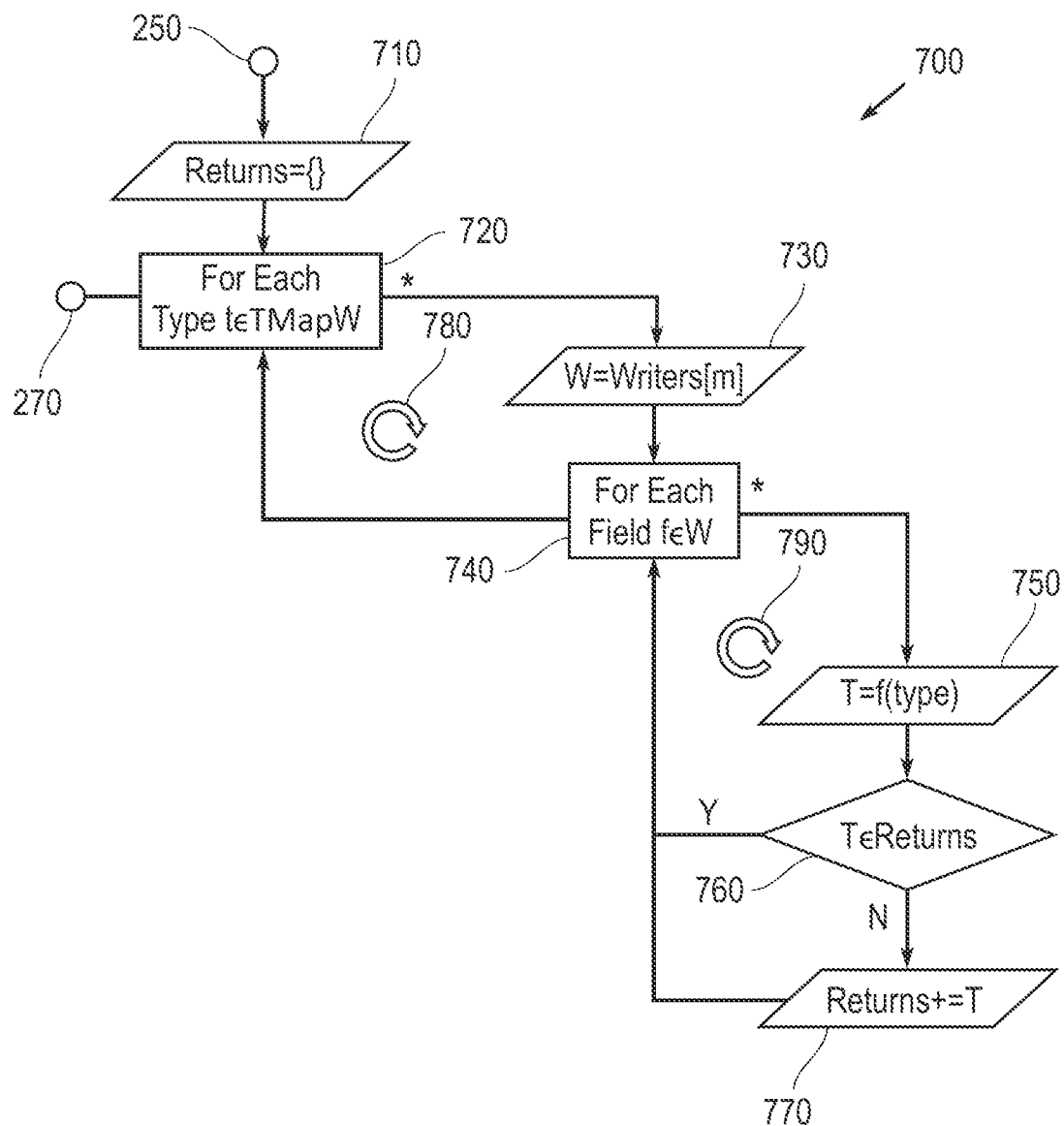
FIG. 7 is a flowchart view of a process to find return types.

FIG. 7 shows a flowchart view 700 for finding return types from parsing types 250 to writing adapters 270. A first declaration 710 creates an empty return set. First loop 720 examines each typed member 375 in TMap. Second declaration 730 recovers the Writer associated with the member 375. Sub loop 740 examines each field (f) 390 found in Writer for declaration 730. A field is always associated with a type found in TMap. In declaration 750, the type of the field is determined. In decision 760, the uniqueness of the field type is examined by searching for it in the Returns set in declaration 710. If the type is not found, then the type is added to the return set in fourth declaration 770. If the type is found and thus being known, then the process returns to loop 740. When the set of fields 390 is exhausted by loop 790, the process returns to loop 720. The process ends when the set of members 375 in TMap is exhausted by loop cycle 780. Those with ordinary skill in the art will note that Methods and other elements may be queried in cycle 790. The exemplary embodiment demonstrates how the process is conducted. In the case of methods, not only return types, but also parameter types may be of interest. Those with ordinary skill in the art may extend this exemplary embodiment to suit their needs.

This process uses the Writer for declaration 650 to search type location (m') 380 for additional information. Specifically, this loop identifies the return type, which will be associated with each field (f) 390 in that Writer. This is designated a return type because the final adapter uses the type (to be distinguished from typedef 370) of each field 390 as the return type of a method. This survey is conducted as a global effort because the bridge 160 must account for all return types. As a result of this process, the set in declaration 710 contains all the return types that may be used in all interfaces.

Figure 8:
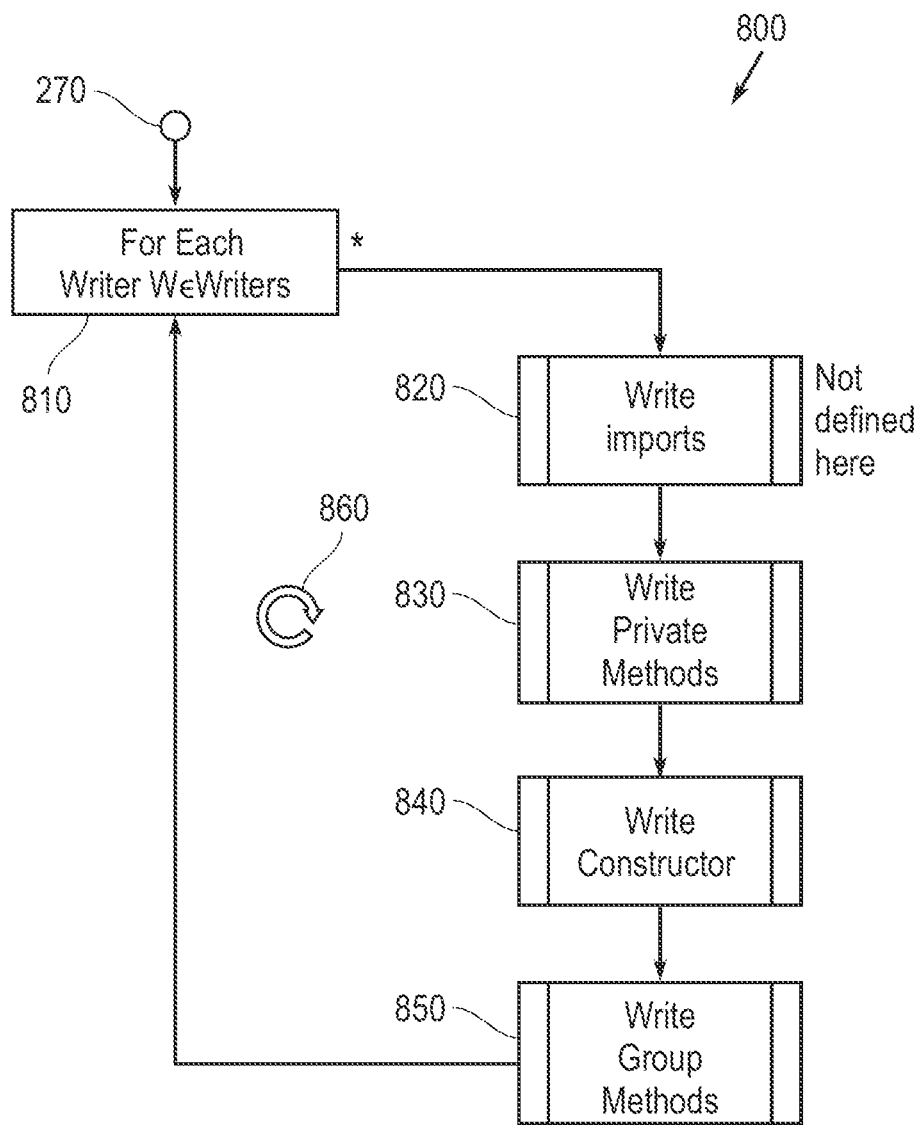
FIG. 8 is a flowchart view of a process for write adapters.

FIG. 8 shows a flowchart view 800 for writing adapters. In a first loop 810, a Writer (W) is selected from the set of writers from declaration 610 and a source code file is written in a series of steps. Instruction 820 writes out the imports. Instruction 830 writes the private methods. Instruction 840 writes the constructors. Instruction 850 writes the group methods. The process for the loop 810 through the instructions constitutes a cycle 860.

One should note that the import statements for an adapter must include all dependencies for the type and all parent types in the full hierarchy. Thus if type X derives from type Y, the adapter for X must include all imports from type X and type Y. This process is not shown herein, but may be facilitated by searching for types through the Writers map in declaration 610. In instruction 820 all unique imports required by the hierarchy of types are written into code for the adapter. Note that imports 335 occur per class file 325 and these have been discovered in loops 470, 480, and 490. Now these are parsed again for declaration in the code.

Figure 9:
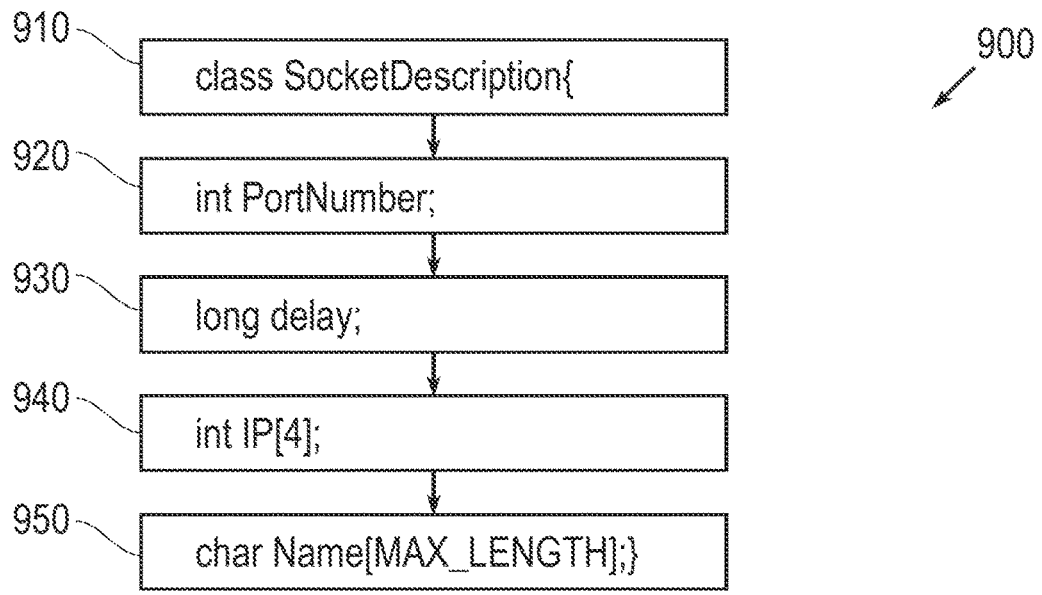
FIG. 9 is a code view of an IDL class description.

FIG. 9 shows a code view 900 that defines fields for a class SocketDescription 910 typical of an IDL class file 120. This example interface is related to network communications. The type includes four fields: PortNumber 920, delay 930, IP 940, and Name 950. Note that IP 940 and Name 950 are array types and that the length of each is defined either by a literal constant. Note also that each field 390 has an associate type (int, long, int* and char* respectively). The interface type SocketDescription will be used extensively in future exemplary embodiments. This code shown in view 900 will be used by the Writer to create an Adapter 140. Those with ordinary skill in the art will be able to program the Writer to produce code for the Adapter 140 to support class members and the specific requirements of the application layer 180.

Figure 10:
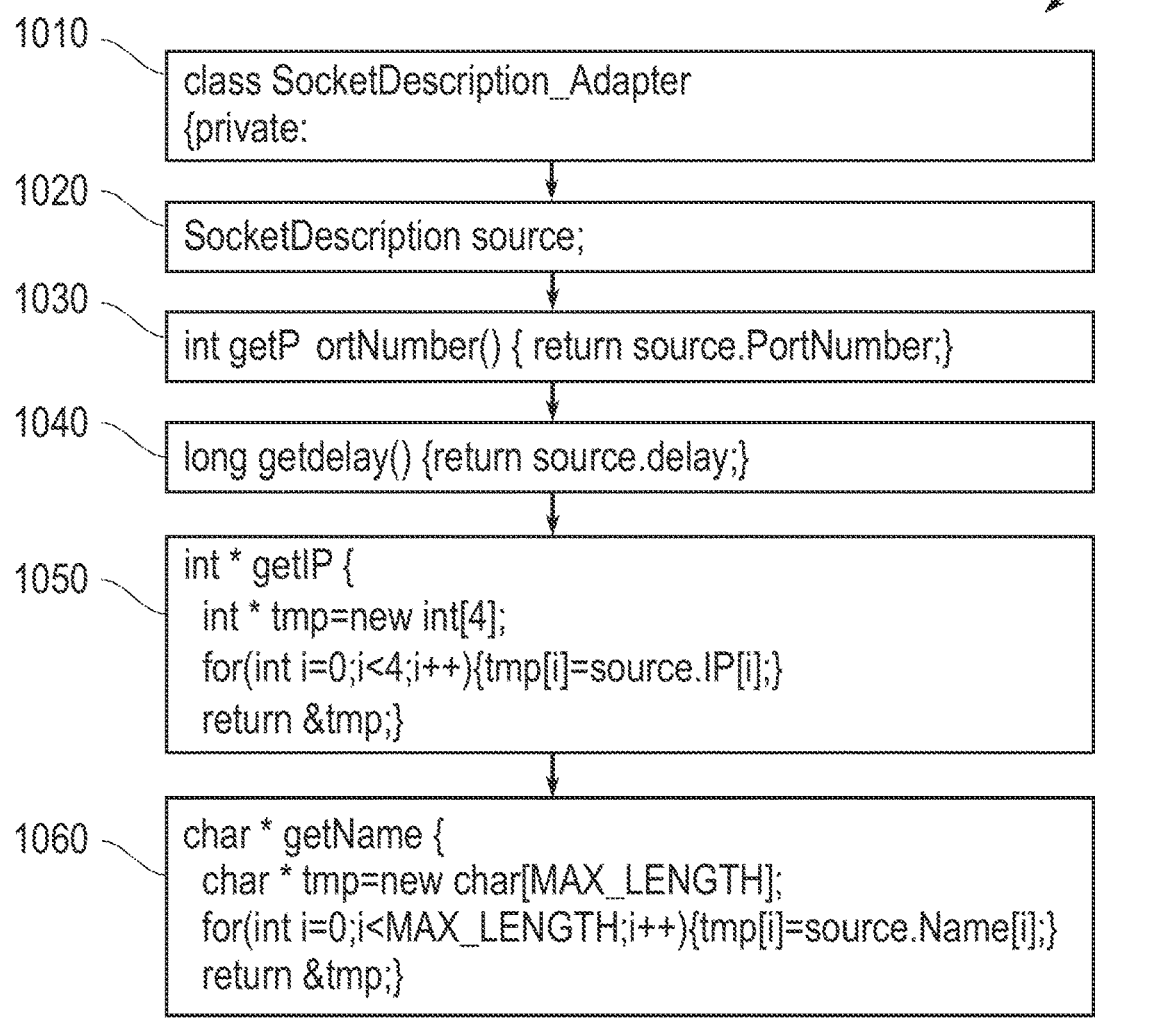
FIG. 10 is a code view of private methods of the adapter class.

FIG. 10 shows a code view 1000 of private methods of the adapter class created in instruction 830 based on the code in view 900. The code includes SocketDescription Adapter 1010 along with several private members for operations: a SocketDescription reference 1020 defined as class 910 and methods getPortNumber 1030, getdelay 1040, getIP 1050, and getName 1060. The Adapter 140 acts as a wrapper around the source instance 1020. Operations 1030 and 1040 respectively return the value of scalar fields for PortNumber 920 and delay 930 and accessed through reference 1010. Note that the name of each method is taken directly from the name of the fields in question, a feature that adds to readability. Operations 1050 and 1060 each return a pointer to an array of fixed size containing the same data as a field in reference 1020, respectively for getIP 1050 and getName 1060. In each case, new memory of fixed size is allocated, and that the size is taken directly from the constants found in the original code in view 900. Again, the name of the method is taken directly from the name of the field. The regularity of the code adds to readability as each class for Adapter 140 contains a set of methods that exactly conform to the same structure. Finally, the methods are all private such that they are not directly accessible to an application layer 180. The reason for this will become apparent in subsequent drawings.

Figure 11:
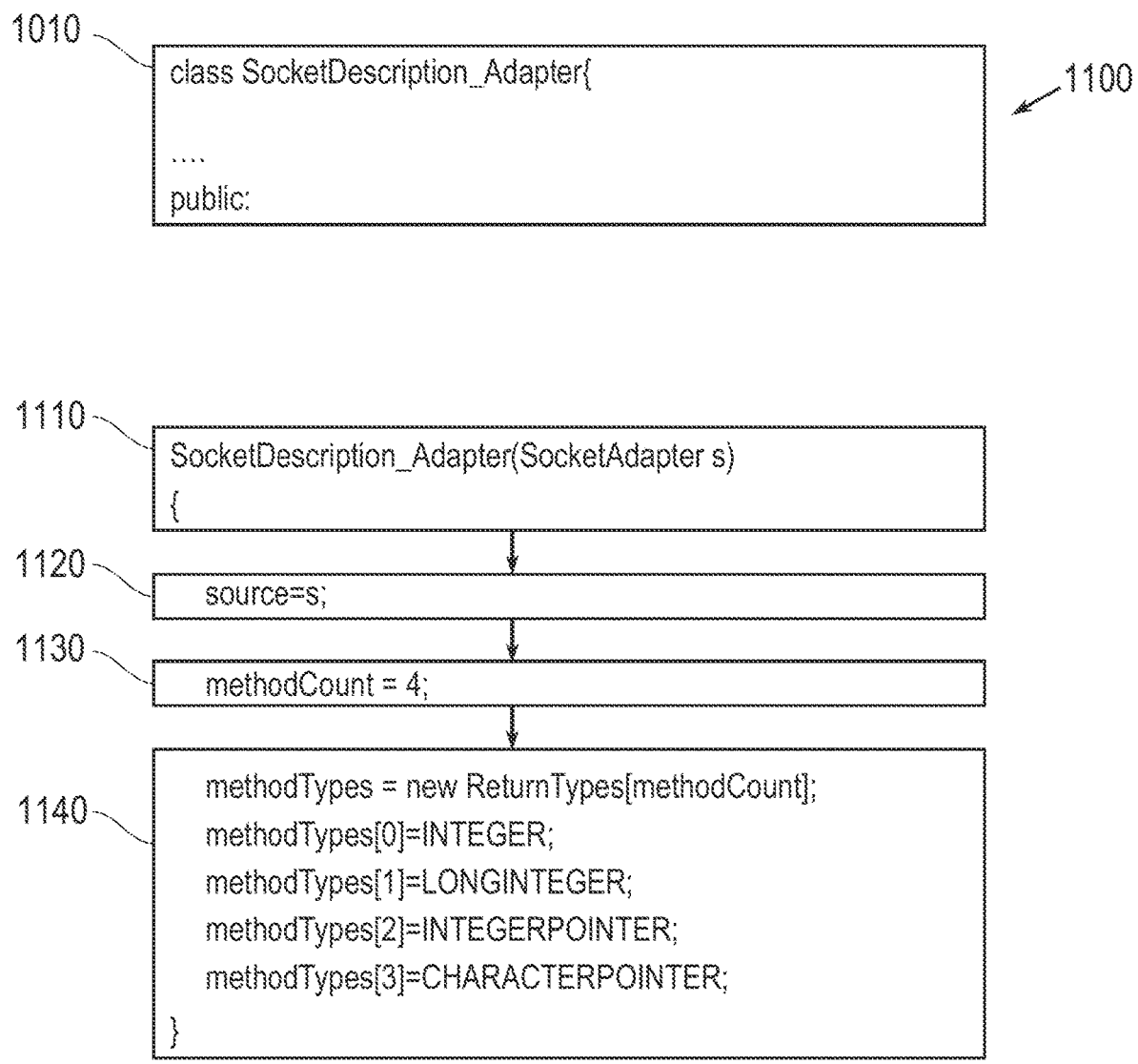
FIG. 11 is a code view of the constructor of the adapter class.

FIG. 11 shows a code view 1100 of the constructor of the class for the Adapter 140 generated by the Write constructor process 840 continuing from the code in view 1000 as part of socket class 910. The instructions in view 1100 continue the Adapter 140 by adding a public constructor 1110 that accepts a SocketDescription parameter and initializes source 1010 by assignment 1120, methodCount 1130, and method-Types 1140, private fields of SocketDescription_Adapter declared outside of this embodiment. Note that each of the array methodTypes 1140 is initialized with return values. These values correspond to members of the original interface type in view 900 and were parsed in find return types instruction 260. The constructor 1110 is designed to receive an instance of the interface type in view 900 to set the source 1010. This provides the class with a reference that is the source of all data returned by the Adapter 140. The method count, methodTypes and methodNames are fields 390 providing metadata on the interface type in view 900 and its fields.

FIG. 12 shows a code view 1200 of the public enumerated accessors among the group methods of the adapter class generated by the Write group methods instruction 850 continuing from the code in 1110 as part of the Adapter 140 in view 1000. The SocketDescription_Adapter class 1010 leads to public group methods that use an index value to give information related to the fields of the interface type in view 900. The getINTEGERMethod 1210 and exception 1220 denote integers. The getMethodName 1230 and exception 1240 denote characters. The getINTEGERMethod 1210 and getMethodName 1230 refer to the field PortNumber 920 at index zero. Group methods such as 1210 and 1230 are built to accommodate any number of private fields or methods that share a specific return type. The only valid integer type is at index zero and method 1210 returns the value of the field derived from the private method 1020. MethodName 1230 demonstrates the power of the index method, as it returns the name of the corresponding field at each index. An error message 1220 is created if the provided index is invalid or out of range. For example, there is no valid integer member at index one so method 1210 would throw an error.

Additional methods corresponding to long getdelay 1040 and int getIP 1050 could be created, which are very similar to socket description 1210, but they are not shown for the sake of conciseness. These exemplary embodiments demonstrate all the features of interest. The advantage of this exemplary design is that the application layer 180 can access an agnostic field by an index value at run time rather than by directly calling a function with a unique Identifier that must already be known at compile time. At this point, one can examine variations on the Adapter 140 not demonstrable by the SocketDescription class 910 and provide additional exemplary embodiments that demonstrate the application of these techniques to other program elements or programs with specific characteristics that add to the understanding of the embodiments.

Figure 13:
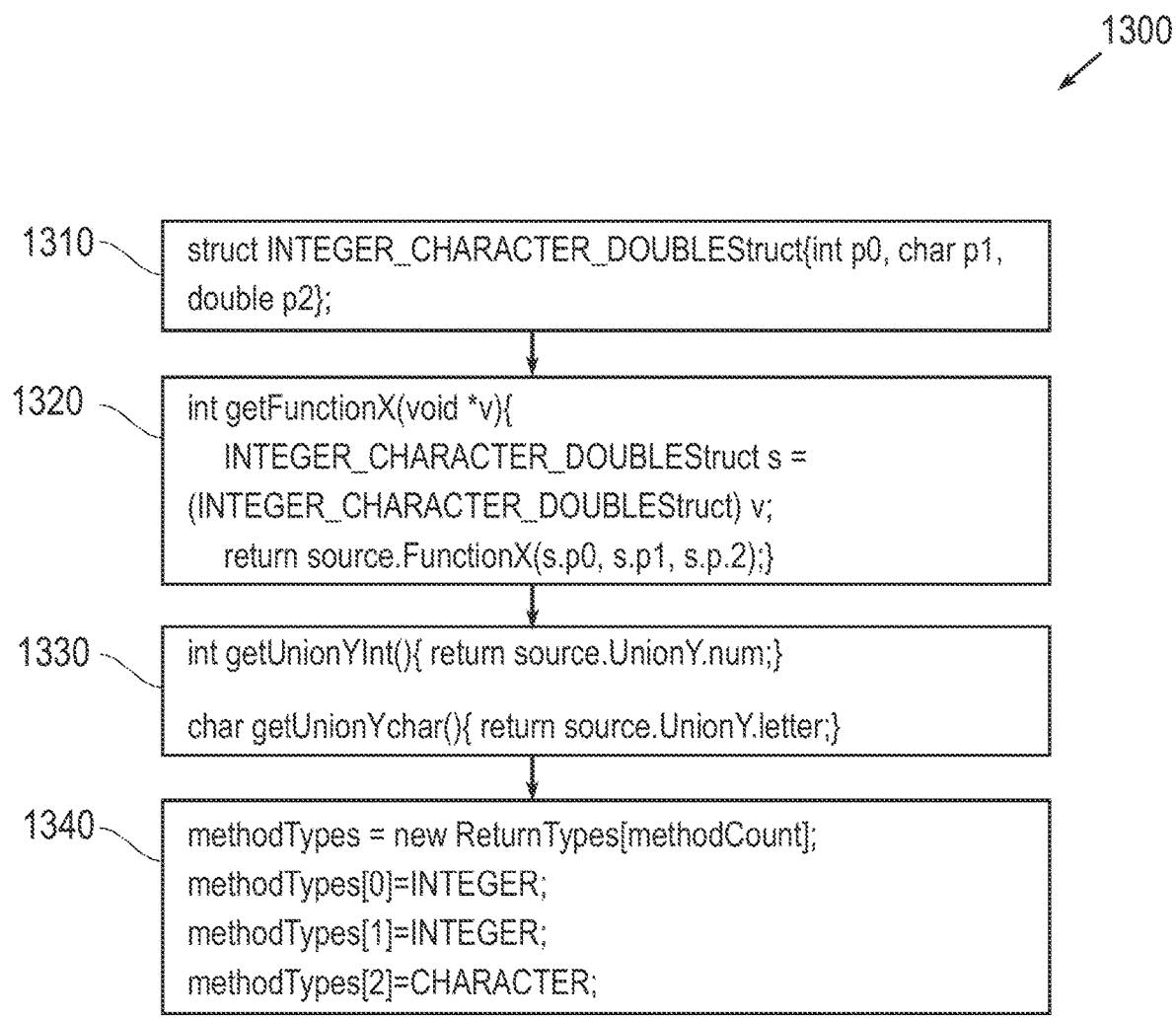
FIG. 13 is a code view of alternative adapter methods for structs, and union types.

FIG. 13 shows a code view 1300 of alternative adapter methods for structs, functions, and union types. Integer get functions 1310, 1320, and method types 1330 are private methods that would be written in an Adapter 140 in instruction 830. A structure, INTEGER_CHARACTER_DOUBLEStruct 1310 is defined to contain parameters specific to FunctionX, a member of some class file 120. In the Adapter 140, a getFunctionX 1320 is defined to cast the parameters into the struct and then access FunctionX in the source reference, much as in get PortNumber method 1020. The casting is necessary because parameters are untyped in a public function similar to method 1220. Union's may contain one of several types, so methods 1330 cast the parameter to the required type. The return types of each method are enumerated in array 1340 just as with method-Types 1140.

The addition of a function introduces the need for parameters. Owing to the various types that may exist in any function, a Struct 1310 is needed to encapsulate that variety and is named to promote readability, while the parameters are simply indices. The instantiation of the Struct 1310 would be best handled by a Builder pattern, which accepts sequential, index based values and returns the final Struct 1310 when complete. Private union methods 1330 cast the union into the different type interpretations.

The addition of a union introduces the need for various return types 1330. This is best handled through the same mechanism already demonstrated. Note in this embodiment that UnionY is represented by two distinct private methods 1320 and that ReturnTypes holds places for each of the potential types. This pattern may be repeated for any number of return types and for distinct members of nested types. Again, artisans of ordinary skill can implement methods based on the same technique to suit their needs.

This discussion of the Method and Union types introduces the potential for a number of types. Enumerations may require separate Adapters to embody specific interpretation of data related to the type. These exemplary embodiments relate to the largest complexity, i.e., the class, but enumerations are also demonstrated as a distinct Adapter type.

Figure 14:
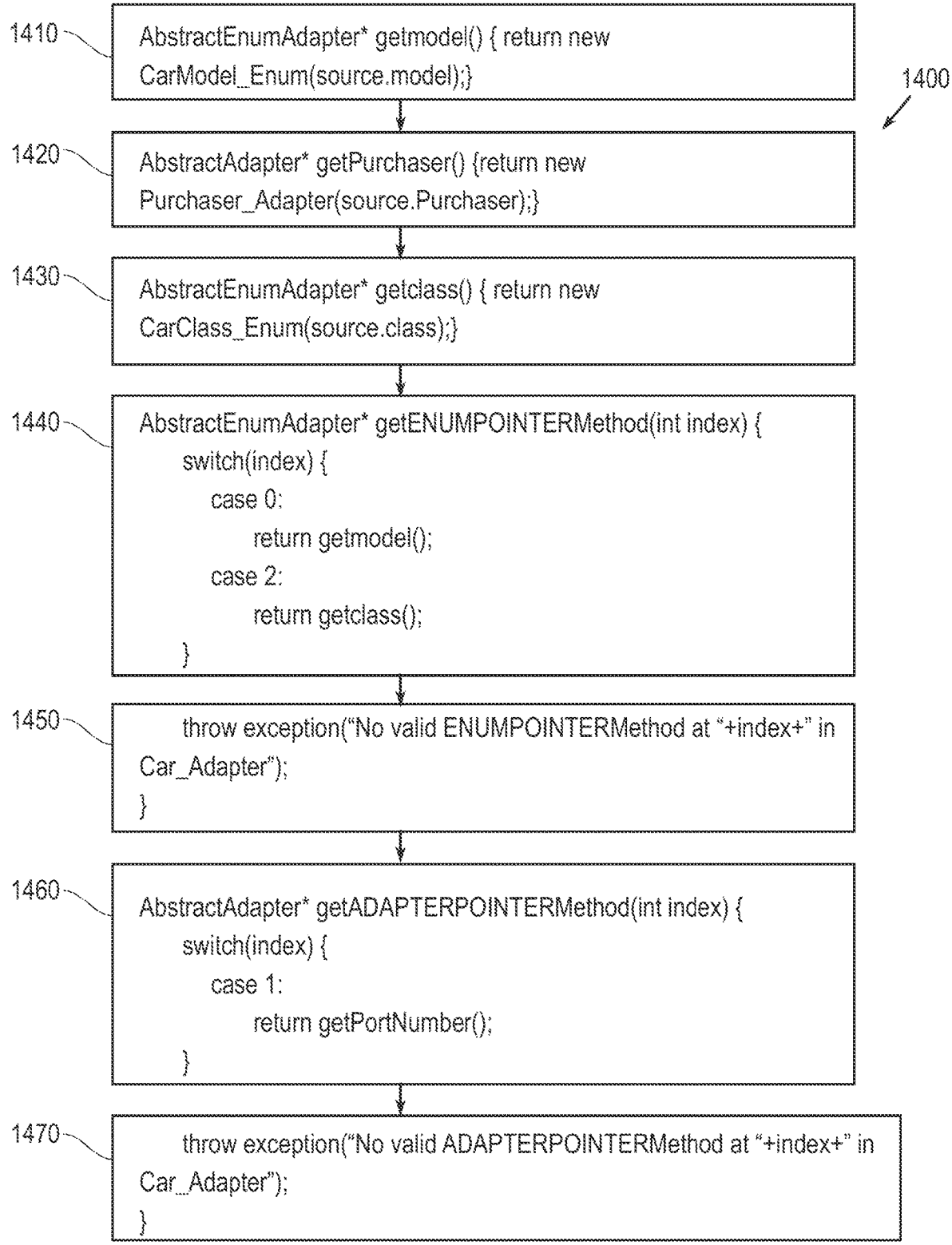
FIG. 14 is a code view of alternative adapter methods for enumerated or nested types.

FIG. 14 shows a code view 1400 of alternative adapter methods for enumerated or nested types. It consists of private methods 1410, 1420, and 1430; and group methods 1440 and 1460 in relation to an automobile or "car" and a purchaser. Expulsion of invalid indices 1450 and 1470 respectively occur in the group methods 1440 and 1450 in the same mechanism seen in methods 1210 and 1220. These methods return pointers to specific adapters that are instantiations of the concrete adapter class for model and purchaser enumerations. This view also shows the utility of the group methods by showing non-consecutive indexed actuation of the private methods in 1440. Invalid indices cause expulsion 1450 and 1470 of exceptions. Private methods 1410 and 1430 respectively obtain pointers to adapters specific to enumerations for car model and class. Private method 1420 returns a pointer to adapters for a nested type purchaser. Group methods 1440 and 1450 issue respective enum and adapter pointers for example cases.

The exemplary embodiment in view 1400 is based on the concept of a car class that contains enumerations for model and class that describe the vehicle. Purchaser in private method 1420 is another class reference describing the person who bought the car. Because enumerations have distinct properties different from a class, it is convenient to define the AbstractEnumAdapter class in Date method 1430, which can be extended for enumerations. The concrete enum adapter class has a constructor, which accepts the integer value and incorporates that value as an index to give the String representation of the value. In the enumeration of model, the value one may equal FordTaurus and the text value of one is the string "Ford Taurus" (as shown by model-make 1910).

Artisans of ordinary skill will note that the private method 1410 returns a pointer to an AbstractEnumAdapter in Private method 1410 rather than the concrete type. This enables the calling class to receive and adopt an instance of a known abstract type rather than an unknown concrete one. This same pattern is used for the Purchaser AbstractAdapter in private method 1420, which is returned by its abstract type. This decision maximizes the reusability of this code through the use of polymorphism.

Moreover, this exemplary design uses composition so that each AbstractAdapter 1420 may recursively contain additional enum or class types. The same recursive structure may be extended to additional types for Unions and other parameters using the same basic technique. Those with ordinary skill in the art can implement such new adapter types to suit their needs.

Figure 15:
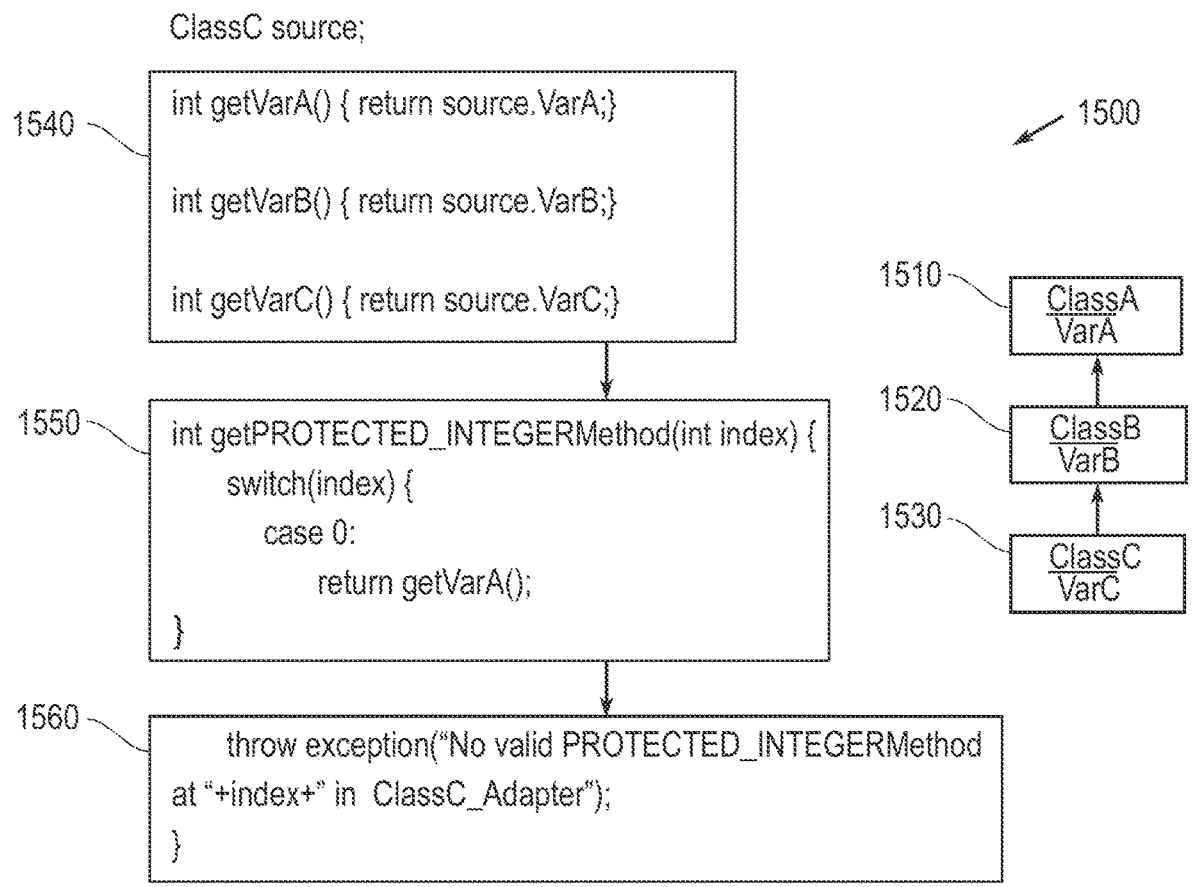
FIG. 15 is a code view of alternative adapter methods for inherited and protected members.

FIG. 15 shows a code view 1500 of alternative adapter methods for inherited and protected members and accompanying class diagram showing inheritance relationships between classes ClassA 1510, ClassB 1520, and ClassC 1530. The source code contains a source reference of type ClassC 1530 and private members 1540 which respectively access members VarA, VarB and VarC of the source. Note the accompanying class diagram with classes. These classes contain the same members respectively. Group method 1550 is defined as protected by metadata in the method name and throws an exception 1560 for invalid indices.

Thus far, these embodiments have not shown the impact of any parent hierarchy as the interface type in view 900 has no parent class. For interfaces where a parent type is possible the public fields of the parent type are just as accessible as those of the child type and they must be represented. In the Write Imports subprocess 820, that hierarchy is investigated and all includes and public members are identified. Source code in view 1500 contains private methods that expose all these members. Because these members would be accessible through ClassC 1530, it is necessary that private methods be defined to access these members. These methods are incorporated into the various group methods and collections previously discussed just as any other member of the source.

The above description above applies only to publically accessible members. With slight adaptation, the pattern could be extended to protected members as well. Consider that the Adapter class may extend ClassC 1530. In so doing, the adapter would gain access to all protected members such that entries could be protected, and the same code would still operate. Interest in protected members would require the adapter to implement a separate group methods such as Group method 1550 that correspond to the protected members. This design enables the application layer 180 to simulate either composition or extension of the source, as well as identify the protected members and access them as if they were public. Those with ordinary skill in the art will note that this appears to violate encapsulation of the protected members as they are exposed to the application. The risk, however, is no greater than if the application were to develop its own public accessors for the protected members.

Figure 16:
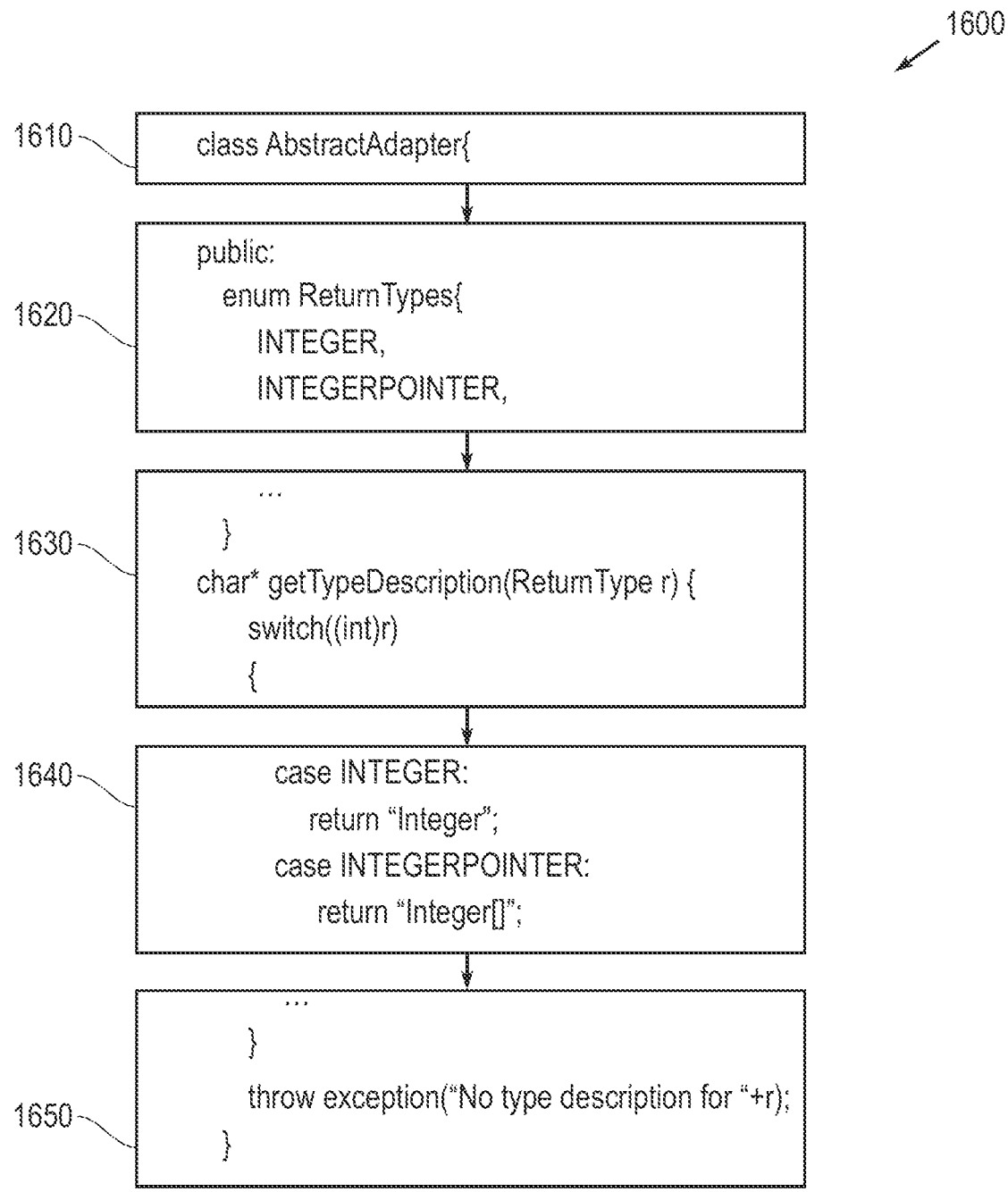
FIG. 16 is a code view of members of the Bridge.

FIG. 16 shows a code view 1600 of members of the Bridge 160. Note that the Bridge pattern is implemented with a common, abstract parent type common to all concrete Adapter classes 1000. The parent type contains an enumeration 1620 of all return types discovered in instruction 260. Exemplary embodiments show typical return types making a full listing unnecessary. The class further contains a type description method 1630, which translates the enumeration members into a string representation. Exemplary embodiments show translations of typical types integer and integer pointer 1640, rendering a full listing unnecessary. An error message 1650 is created if the method is parameterized with a value outside of the ReturnType enumeration 1620.

Up to this point, the exemplary embodiments have focused on the individual members of the interface types, however, several of these members can only be fully understood in light of the AbstractAdapter class 1610 from which all Adapters 140 are created. During process 260 before the individual adapters are written, the various return types 1620 are recorded to a universal set that is kept until the Write abstractions 280 process. When the Bridge code 1610 is generated, the ReturnType enumeration 1620 and the string translation method 1630 are generated. This is counter intuitive because an enumeration is generally defined before being used. In this case, the enumeration 1620 is generated in the abstract parent after all of its uses have already been written. Similarly, the method that translates the return types to string representations 1630 is written after all child types have been defined and written. This pattern or writing the generalized method after the fact repeats in several of the following exemplary embodiments.

The names of the return types can be taken automatically from classes such as in socket description 910, but how they are written is entirely open to the developer and those skilled in the art may choose a slightly different implementation. In this exemplary embodiment, all arrays are typed as "POINTER" in the ReturnTypes 1620 and as "[ ]" in the text description in process 1630. Note that the string descriptions correspond to the return types. The full list of ReturnTypes, not shown here, may be directly derived from the set accumulated from view 900 in process 260 and interpreted as text for all the corresponding lines in process 1630. As a defensive measure, the last line of return type translation process 1630 is an exception, but throws an exception with error message 1650 for submission of an invalid value. This forces the application layer 180 to pass a valid value for ReturnType. C++ has no defensive capabilities, and this one line provides significant error checking capability to all the interface types in view 1000 generated in process 270.

Figure 17:
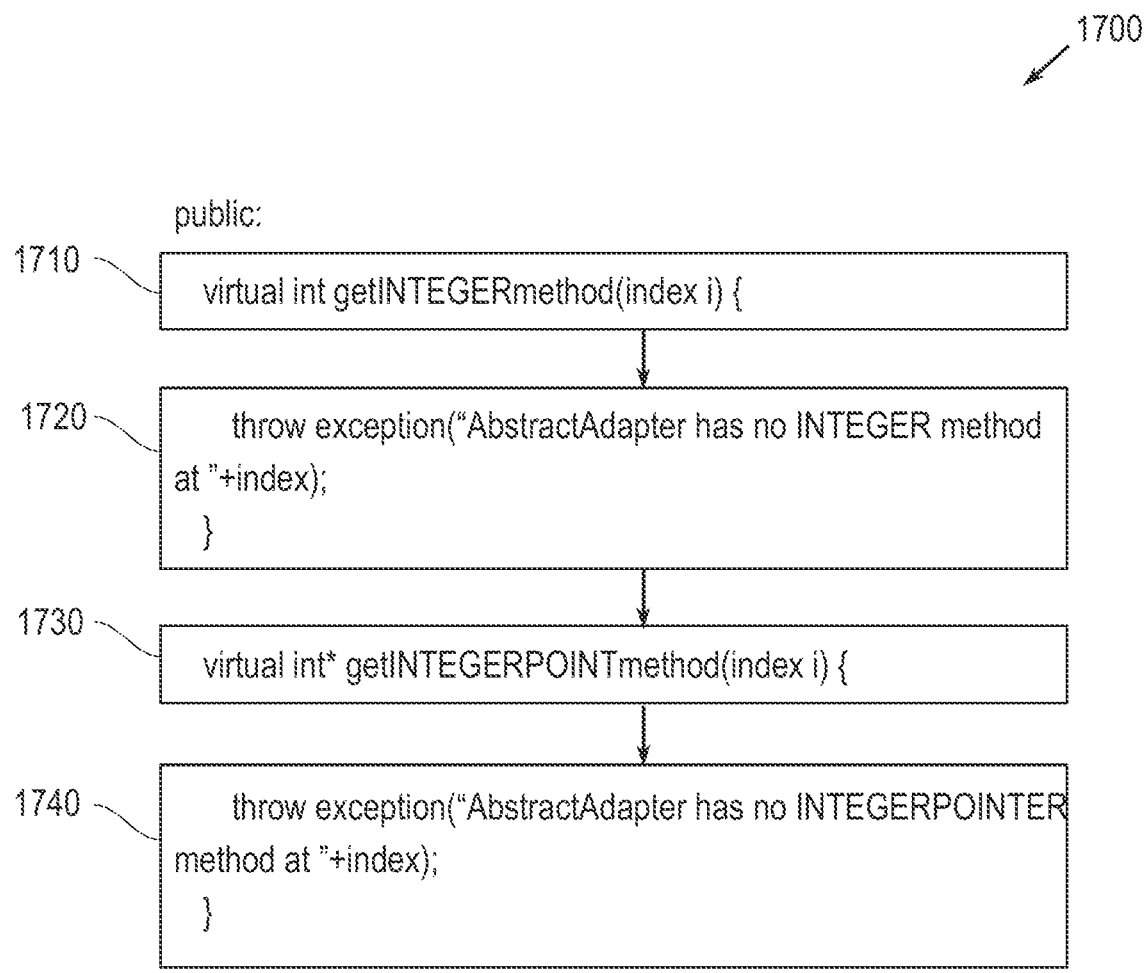
FIG. 17 is a code view of base implementation of group methods in the AbstractAdapter class.

FIG. 17 shows a code view 1700 of public virtual members of the Bridge 160 in continuation of the view 1600. The operations include methods to getINTEGER 1710, its exception 1720, along with getINTEGERPOINT 1730 and its exception 1740. In this exemplary embodiment, the public virtual members 1710 and 1730 are defined. Note that methods 1710 and 1730 are virtual methods and throw exceptions 1720 and 1740 by default. The virtual member 1710 was extended by method 1210. Similarly, virtual member 1730 could be extended by each adapter in view 1000, although none has been shown in these embodiments. Additional virtual members, shown here, would be added to view 1600 to support each of the group methods already shown (e.g. 1210, 1440, 1460, and 1550).

The source code in view 1700 shows the definition of several public virtual members that are critical to the exemplary embodiments previously seen. The protected fields methodCount 1130 and methodTypes 1140 are not shown, but would be declared here. The actual definition is specific to each type as instructions shown in view 1000. A different definition of methodTypes 1330 exemplifies the highly individualistic nature of these definitions. By declaring the protected members here, they may be defined by any class for Adapter 140 to suit the needs of the individual interface types.

The public methods 1710 and 1720 defined in AbstractAdapter 1610 provide a fixed public access in the Bridge 160 to methods that will be individually defined by Adapters 140. This design produces a smooth transition from the application layer 180 through the Bridge layer 160 (i.e., class AbstractAdapter 1610) to the concrete Adapter 140. Again, counter to normal intuition the methods and protected fields are written well after each of the child classes has defined its various implementations. In this case, the code is automatically generated without concern for or knowledge of the various implementations.

Figure 18:
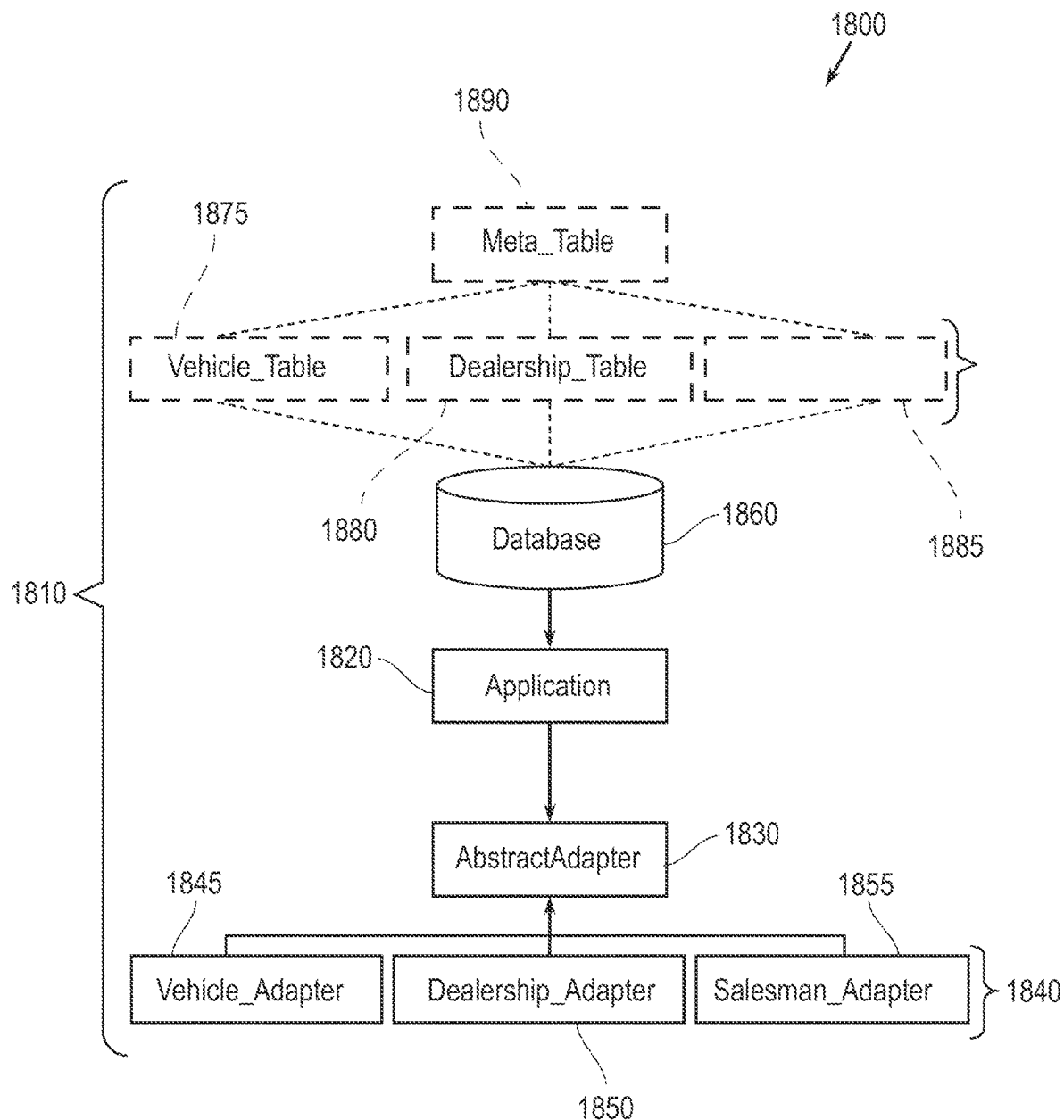
FIG. 18 is a block diagram view of a combination of data sources.

FIG. 18 shows a block diagram view 1800 for one concept of automobile sales (as an example) that pairs interface types with database storage. Application 1810 uses the Application process 1820 with an AbstractionAdapter 1830 to receive one of three interface types 1840, 1845, and 1850, respectively for Salesman, Vehicle, and Dealership as types. The application also interfaces with a database 1860 with tables as a set 1870, which correspond to the three types 1875, 1880, and 1885. A meta table 1890 is used to describe the contents of each table in the set 1870.

In addition to the views of AbstractAdapter 1830 shown in FIGS. 16 through 18, additional abstractions may be written. As already discussed, an AbstractEnumAdapter 1410 or other Adapter types may be defined in a similar manner. Additional abstractions may include an exception type defined for the specific use in all Adapters 140 vis-à-vis exceptions with messages 1230, 1450, 1460, 1560, 1650, 1710, and 1720. The use of a common exception type specific to all interfaces enables the application layer 180 to catch that exception and handle it as a problem with the interface rather than its own logic. Additional abstractions may include a default implementation of the AbstractAdapter 1830 with no members. Such an object can serve as a "null" value when compared with other objects or as a placeholder. Additional abstractions may include a complete AbstractAdapter 1830 with return types based on all possible values and thus encompassing a general abstraction that might be applied to all potential users. Those with ordinary skill in the art may devise additional abstractions and metadata to be added to concrete adapters, which do not depart from the spirit of this invention.

The primary advantage of various embodiments lies in the areas of interface universality, especially where changes are common. Rather than requiring a more flexible framework (e.g., Java or web-based protocols), the message paradigm can be supported through the use of metadata and source code classes automatically compiled from available data. This creates the same flexibility at a program level, which has traditionally been unavailable to statically compiled languages. Moreover, because exemplary embodiments involve automatically generated code, changes to the interface can be immediately adopted through a variety of methods.

In the concept of employment for view 1800, the Application 1820 employs exemplary embodiments to receive one of three message types related to car sales. Each message can be queried for its metadata by accessing the getCount, getMethodTypes, and getMethodName 1230 defined in the Abstraction 1820. This information can be used to create the database tables 1875, 1880, and 1885. The metadata table 1870 will contain essentially the same metadata that are extracted from each type. The Application 1820 may then store the various messages in a database 1860 and enable programmatic access to the tables based on the various fields. Supposing that the Application 1820 displays this information to an operator, that person can select which car, dealership, etc. is of interest, along with the various fields using the names defined for the type. This concept of employment provides a useful demonstration of exemplary embodiments in a typical client/server connection, but divested of the requirement for fixed interface types.

Figure 19:
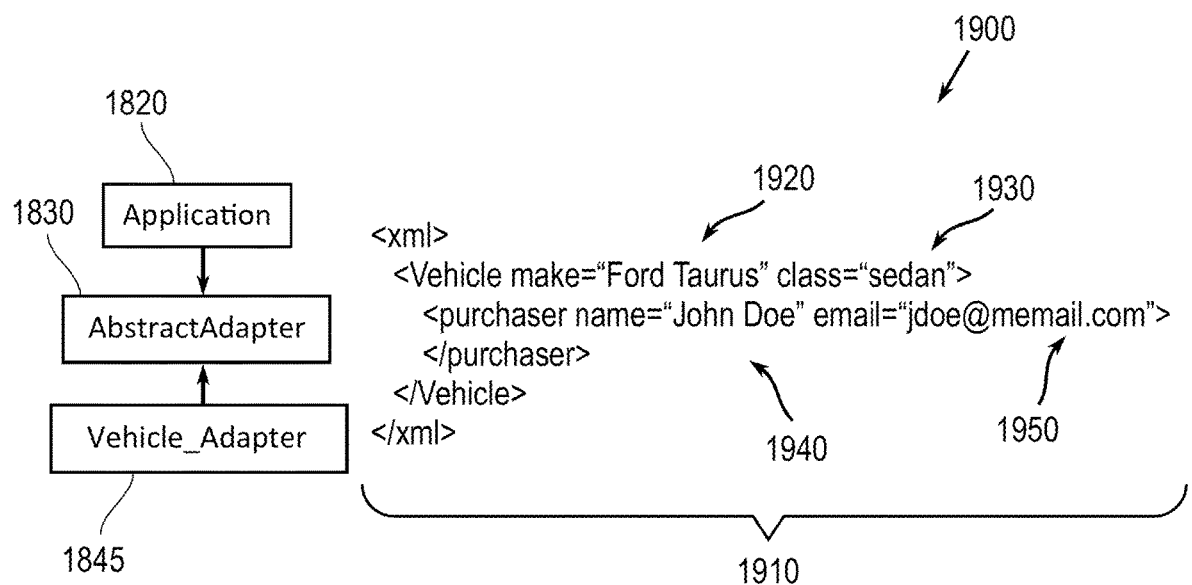
FIG. 19 is a block diagram view of a adapters for data.

FIG. 19 shows a block diagram view 1900 for one concept of employment that is comparable to source code as in view 1400. In this view, the class diagram is contrasted with a JSON or REST message 1910 structured using XML. JSON is JavaScript Object Notation: a data file format. REST is REpresentational State Transfer an application programming interface. The diagram shows the application layer 1820, abstraction layer 1830, and concrete adapter 1845, in this case for the vehicle. The XML text 1910 shows definitions for the model 1410, class 1430, and purchaser 1420 of the vehicle. The vehicle has attributes for model-make 1920 and class 1930. The purchaser has attributes for name 1940 and email 1950.

In the concept of employment for view 1900, the application 1820 is employing the invention to receive a message comparable to REST or JSON representations. The Vehicle_Adapter 1845 would contain members demonstrated in source code of view 1400. The XML based text 1910 demonstrates a similar set of elements. Note that the purchaser 1420 is a separate entity associated with the vehicle 1410, just as the purchaser was a member of the source reference and returned a PurchasertAdapter in 1420, which gave the same recursive access described in text 1910. Note also that the enumerations in 1410 are not as apparent in the XML message where enumerated types are indistinguishable from unique identifiers in text 2010. If Application 1820 used REST or JSON technology, it would still have to parse the necessary data from the message 2010, eventually having all the relevant data and metadata. Exemplary embodiments enable an object-based communication paradigm in a statically compiled language like C++, which is comparable in every way to the well know REST and JSON standards.

Figure 20:
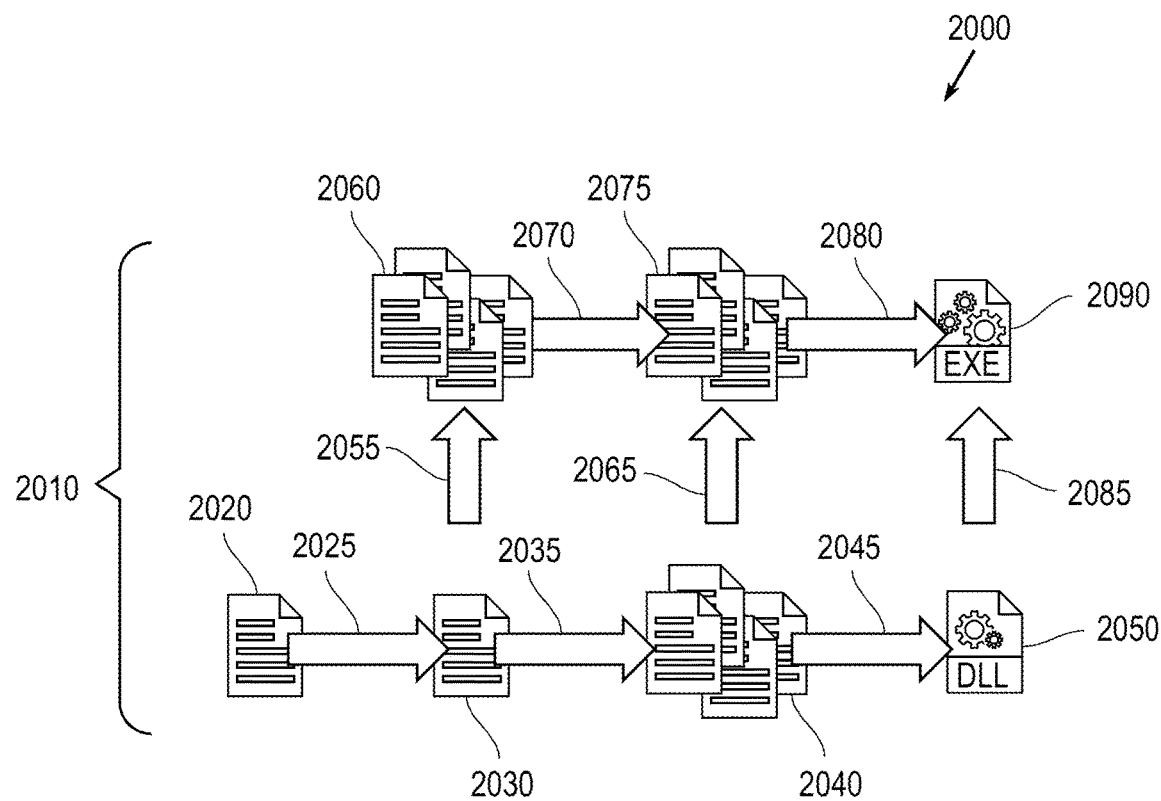
FIG. 20 is a schematic view of multiple paths to form executable code.

FIG. 20 shows a block diagram view 2000 for one concept of employment that depicts the multiple pathways 2010 by which an IDL-defined interface 2020 may become part of an application 1820. View 2000 depicts the IDL file 2020, which is compiled by ANT 2025 into a C++ source file 2030. Exemplary embodiments can use the Python library 2035 to create a set of automatically generated adapters and abstractions 2040. A first compiler 2045 compiles the files into a digital library 2050.

The source file 2030 may be used to manually encode 2055 such conventional manual adapters 2060. Either the automatically 2040 or manually 2060 written adapters may be included in the application source code 2075 through processes 2065 and 2070 respectively. A second compiler 2080 compiles the application source code 2075 into a final executable application 2090. Alternatively, the automatically generated adapters 2040 can be compiled 2045 into the library 2050, which can be linked 2085 into the executable 2090 based on a known API.

In the concept of employment for view 2000, the application 2090 is able to receive messages based on the IDL-defined interface 2020. Three pathways are depicted that enable that capability: (a) 2055, 2070, 2080; (b) 2035, 2065, 2080; (c) 2035, 2045, 2085. Of these pathways, only the first involves a manual process 2055, while the others are reasonable adaptations of exemplary embodiments. Exemplary embodiments bypass the manual process 2055 by automatically generating via the Python library 2035 the various adapters 140 and abstractions. Either follow-on process 2065 or 2045 is entirely automated such that no human effort is involved. Thus the exemplary process is executed at the cost of machine-hours, rather than man-hours.

This diagram view 2000 also serves to demonstrate the effects of future changes. Consider changes in the IDL 2020, Adapters 2040, and Application executable 2090 of application 1820. In the first case, the manual process 2055 would require additional rework to support changes in the IDL 2020. Therefore, perennial changes to the IDL 2020 are the driving force of changes to the application source code 2075 at the cost of hours of manual coding and subsequent testing. Using exemplary embodiments, changes in the IDL 2020 only require the execution of automatic processes (2025 and 2030) and the application layer remains constant. Moreover, because the messages change independently of the application, no testing is required. This reduces the total cost to maintain the application and increases its stability.

In the second case, changes may be required to the adapters based on new requirements from the application. For example, metadata may be added to describe the C++ class, give unique identifiers to each message object, etc. When these requirements are added, the automatic code generation process 2035 can be altered to include the new features. Changing that process 2035 is the result of manual coding, but one that is limited to single changes that will affect all adapters. Testing should be conducted to validate the new adapter code, but that testing may be performed on any single interface type in conjunction with the new feature defined by the application 2090. This is possible because all the automatically generated code 2040 is either equally correct or equally wrong.

By way of contrast, in the manual process 2055 the same change would be multiplied for each of the interface types, requiring extensive, repetitive changes to several code files. In the manual process, the opportunity for errors is multiplied and diversified, as each error may be different from all others. Changes of this type add risk to the program and may not be validated without extensive testing of each IDL 2020. The advantage of the inventive process is demonstrated both in the ease with which changes can be made and the reduced testing impact.

In the third case, changes may be required in the application itself. In the exemplary process, these changes are entirely independent of the various adapters, and the application is able to work with the existing API. Ignoring new requirements that affect the adapter API, the presence of multiple interface types has zero additional influence when the application changes.

By way of contrast, the manual process tends to produce adapters that are coupled with the application and are likely to be brittle, forcing additional change. Typically, as the application changes, newer interface types will be manually implemented to reflect the latest API while older interface types are left alone. This leads to a set of static design phases in conventional manually developed adapters 2060—a sort of archeological history of the API. Consequently, manual adapters 2060 may contain a variety of sub-optimal designs. In the exemplary embodiments, the cost of updating older interfaces is avoided.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented software diagnostic method integrating interfaces in software, said method comprising steps of:
   compiling an Interface Description Language (IDL) file into a source file;
   incorporating a source library to said source file to produce a plurality of adapters and abstractions;
   compiling said adapters and abstractions into a digital library;
   transferring said adapters and abstractions in said digital library by a common interface from a bridge pattern into an application source code, wherein said common interface is defined with:
   an exception type specific to said common interface,
   a public enumeration of all return types,
   a public method to translate return types into a text representation,
   public return-type specific methods that accept an index value,
   default virtual implementations of all methods that throw exceptions, and
   public methods that return protected metadata specific to each said adapter;
   linking said application source code with said source library to produce a combination file; and
   compiling said combination file into an executable application file.

2. The method according to claim 1, wherein said adapters and abstractions are stored in a database.

* * * * *